H. A. OLSSON & S. G. WINGQUIST.
RETAINER FOR BALL BEARINGS.
APPLICATION FILED MAR. 18, 1911.

1,023,751.

Patented Apr. 16, 1912.

WITNESSES:

INVENTORS,
HENNING ADOLF OLSSON
and SVEN GUSTAF WINGQUIST,
by
Attorney.

UNITED STATES PATENT OFFICE.

HENNING ADOLF OLSSON AND SVEN GUSTAF WINGQUIST, OF GOTTENBORG, SWEDEN, ASSIGNORS TO AKTIEBOLAGET SVENSKA KULLAGERFABRIKEN, OF GOTTENBORG, SWEDEN, A CORPORATION OF SWEDEN.

RETAINER FOR BALL-BEARINGS.

1,023,751. Specification of Letters Patent. Patented Apr. 16, 1912.

Application filed March 18, 1911. Serial No. 615,340.

*To all whom it may concern:*

Be it known that we, HENNING ADOLF OLSSON, a subject of the King of Sweden, and resident of Villa Säfvenäs No. 5, Gottenborg, in the Kingdom of Sweden, and SVEN GUSTAF WINGQUIST, a subject of the King of Sweden, and resident of Villa Mariedal, Gottenborg, in the Kingdom of Sweden, have invented certain new and useful Improvements in Retainers for Ball-Bearings, of which the following is a specification, reference being had therein to the accompanying drawing.

This invention relates to a retainer or cage for ball bearings, which is so arranged that the same, in spite of being made in one piece, is able to keep apart two rows or sets of balls and to embrace the balls of the said rows simultaneously. Consequently, the retainer or cage is adapted to ball bearings having two rows of balls, but a plurality of pairs of such rows may, evidently be provided in the bearing each pair held in position by a retainer.

Figure 1:
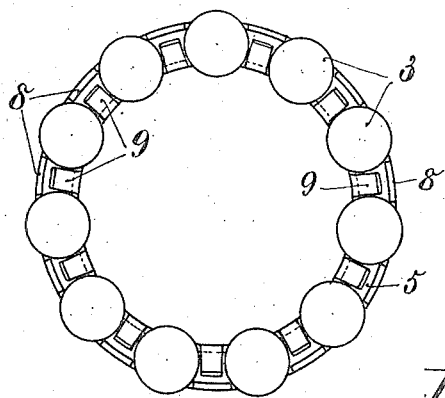
Figure 2:
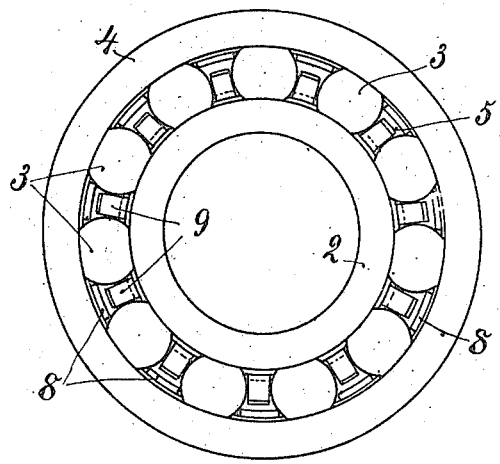
Figure 3:
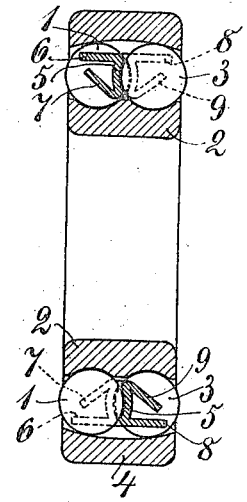
Figure 4:
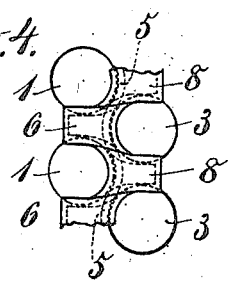

In the accompanying drawing Figure 1 is a side view of a retainer with balls located in the same. Fig. 2 is a side view of a ball bearing and Fig. 3 is an axial section of the same. Fig. 4 is an outer edge view of a part of the retainer with balls, located in the same.

The retainer or cage consists of a circular ring 5 of sheet metal, which ring at its outer and inner edge respectively is provided with projections or teeth 6, 7, 8, 9, extending alternately in opposite directions and longitudinally of the axis of the ring. The said teeth are effected in such manner, that the originally plane ring is provided with radial cuts at its outer and inner edges and at distances from each other determined by the number of balls of each row. The teeth thus formed are bent laterally, in opposite directions alternately, in the same order at both edges of the ring, so that two teeth projecting from the outer and inner edges respectively of the ring are located opposite each other. The positions of the balls in the retainer are shown also in Fig. 3. For each of the two rows of balls 1 and 3 a groove is provided in the inner ring 2 of the bearing and the said rows are inclosed by the outer ring 4 of the bearing, which ring 4 has a spherical inner side, so that the inner ring 2 together with the balls and the retainer can be rotated laterally inside the same, while the bearing is put together or taken to pieces. The diameter of the retainer and the positions of the teeth are so adapted, that the teeth 6, 8 are located between the balls but outside their center points with relation to the axis of the bearing. The width of the teeth is greater than the shortest distance between the balls, so that the balls are supported by the edges of the teeth, as shown in Figs. 1, 2 and 4. The inner teeth 7, 9 are located inside the center points of the balls at their connection with the ring but are bent outward and extend into the spaces between the balls, so that the free ends of the teeth coincide with a circular line passing through the center points of the balls in the row. Consequently, each ball of the row is separated from the adjacent one by two teeth 6, 7 and 8, 9 respectively, one of which at least, viz. the inner one, is located for some part opposite the center points of the balls, so that the balls are prevented from forcing aside the teeth and approaching each other. The balls are supported outward by the teeth 6, 8 and laterally by the body of the ring, which is cup shaped opposite each ball in accordance with the size of the ball.

As the bearing is put together, the balls are located into the retainer mounted on the inner ring of the bearing, which is easily effected owing to the fact that the teeth 6 or 8 yield outward, as the ball is forced from the outside into the groove of the ring 2. The balls are then not able to leave by themselves their places, because the ring 2 supports the same inside radially and at one side, while the teeth 6, 8 support the same outside and radially. The ring 4 is then located outside the whole. During the operation of the bearing the teeth 7 and 9, which owing to the described positions of the same between the balls can not be forced sidewise by the pressure exerted by the balls, form distance pieces, which prevent the balls from approaching each other. Owing to the described construction of the bearing the retainer, on the other side, is prevented from coming into contact with the rings 1, 2 of the bearing.

Having now described our invention, what we claim as new and desire to secure by Letters Patent is:

1. A retainer for ball bearings with two rows of balls, consisting of a ring of sheet metal located between the two rows of balls and provided at its outer edge with projections or teeth extending in both lateral directions and located in the spaces between the balls, outside the center point of same, the said teeth having such a width as allowing them to form outer supports to the balls, and which ring is provided, at its inner edge also, with projections or teeth extending in both lateral directions and coinciding substantially with the circle passing through the centers of all of the balls of each row respectively, the said teeth having a width corresponding to the shortest distance between the balls of the row, for the purpose of keeping the balls apart.

2. In ball bearings with two rows of balls, the combination of an inner ring provided with grooves for the respective rows of balls, and a ball retainer consisting of a ring of sheet metal located between the rows of balls and provided at its outer edge with projections or teeth extending in both lateral directions and having a greater width than the shortest distance between the balls, the said teeth together with the outer edges of the groove of the ring preventing the balls from falling out of the ring, teeth being provided at the inner edge of the ring of sheet metal and extending in both lateral directions and having such a position that they coincide substantially with the circle passing through the center point of the balls of the row and being concentric with the ring of sheet metal.

3. In ball bearings, the combination of an inner bearing ring having annular bearing grooves placed side by side, annular series of balls in said grooves; and an annular retaining cage disposed with its body part disposed about said ring and perpendicular to the axis thereof, said body part being provided at its inner edge with inner staggered teeth of substantially constant width and disposed between adjacent balls at the points of said balls nearest each other and intersecting the circles passing through the centers of all of the balls, to positively hold said balls apart, the outer edge of said body-part being provided with thin, outwardly yieldable staggered teeth of a greater width than said inner teeth and extending in substantially opposite directions near the outermost part of the balls and serving with the outer walls of said grooves to yieldably hold the balls in place.

In witness whereof, we have hereunto signed our names in the presence of two subscribing witnesses.

HENNING ADOLF OLSSON.
SVEN GUSTAF WINGQUIST.

Witnesses:
OLOF PALM,
AUG. JOHANSON.

---

Copies of this patent may be obtained for five cents each, by addressing the "Commissioner of Patents, Washington, D. C."